(12) United States Patent
Tanabe et al.

(10) Patent No.: US 7,778,028 B2
(45) Date of Patent: Aug. 17, 2010

(54) ELECTRICAL UNIT COOLING STRUCTURE FOR MOTORCYCLES

(75) Inventors: Gen Tanabe, Saitama (JP); Ryohei Kitamura, Saitama (JP); Yasuyuki Kadowaki, Saitama (JP); Takashi Arai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/555,165

(22) Filed: Sep. 8, 2009

(65) Prior Publication Data

US 2010/0061058 A1 Mar. 11, 2010

(30) Foreign Application Priority Data

Sep. 11, 2008 (JP) ............... 2008-233018

(51) Int. Cl.
*H05K 7/20* (2006.01)
*B62M 23/02* (2010.01)

(52) U.S. Cl. ............. 361/690; 361/679.46; 361/679.49; 361/697; 296/37.1; 296/198; 180/309; 180/220; 180/229; 180/68.1; 180/68.2; 123/41.49; 123/41.7; 123/41.1; 429/26

(58) Field of Classification Search ............ 361/679.46, 361/679.49, 679.54, 690–697; 429/26, 34, 429/62, 9, 20, 22, 24; 165/80.3, 104.33, 165/185; 296/37.1, 198, 190.09, 203.01; 29/897.2; 180/219, 220, 229, 68.1, 68.2, 180/309, 89.1, 65.1, 68.4, 68.5; 123/41.49, 123/41.7, 41.09, 41.08, 41.1, 184.21, 196
See application file for complete search history.

(56) References Cited

U.S. PATENT DOCUMENTS

| 7,261,172 B2 * | 8/2007 | Tsukada et al. ............ 180/68.1 |
| 7,478,698 B2 * | 1/2009 | Shimizu et al. ............. 180/220 |
| 7,527,115 B2 * | 5/2009 | Tsuya ....................... 180/68.2 |
| 2005/0039719 A1 * | 2/2005 | Moss ................... 123/196 AB |
| 2006/0273608 A1 * | 12/2006 | Shinsho ..................... 296/37.1 |

FOREIGN PATENT DOCUMENTS

| FR | 2735076 A1 * | 12/1996 |
| JP | 406048343 A * | 2/1994 |
| JP | 3552498 B2 | 8/2004 |
| JP | 02007145130 A * | 6/2007 |

\* cited by examiner

*Primary Examiner*—Michael V Datskovskiy
(74) *Attorney, Agent, or Firm*—Birch, Stewart, Kolasch & Birch, LLP

(57) ABSTRACT

Electrical units are effectively cooled, even if the longitudinal length of the cover member in which the electrical units to be cooled are accommodated is short, by easily guiding a flow of air during operation toward the electrical units. A second cover member which constitutes at least a part of a body cover together with a first cover member is positioned ahead of the first cover member which accommodates an electrical unit to be cooled. Inlets which let a flow of air during operation into the second cover member are disposed in the second cover member. An outlet for discharging a flow of air during operation out of the first cover member is provided in the first cover member.

20 Claims, 7 Drawing Sheets

ELECTRICAL UNIT COOLING STRUCTURE FOR MOTORCYCLES

CROSS-REFERENCE TO RELATED APPLICATIONS

The present application claims priority under 35 USC 119 to Japanese Patent Application No. 2008-233018 filed on Sep. 11, 2008 the entire contents of which are hereby incorporated by reference.

BACKGROUND OF THE INVENTION

1. Field of the Invention

The present invention relates to an improvement of an electrical unit cooling structure for motorcycles for effectively cooling heat-emitting electrical units with a flow of air during operation.

2. Description of Background Art

A rectifier is known that is a heat-emitting electrical unit arranged within an engine cover. Inlets for an air flow during operation and an exhaust outlet are provided in the engine cover before and behind the rectifier. See, for example, Japanese Patent No. 3552498.

Japanese Patent No. 3552498 discloses an engine cover that has a sufficient longitudinal length to permit the arrangement of the inlets for an air flow during operation and the exhaust outlet before and behind the rectifier. The rectifier is cooled by directing an air flow during operation through the inlets from alongside the engine cover to the forward end of a wind guide path formed beside a regulator and discharging the air flow during operation by circulating the air flow via the wind guide path through the exhaust outlet toward alongside the engine cover. However, if the cover member in which the rectifier is accommodated is short in the longitudinal direction or some other electrical unit is arranged behind the rectifier, it will be difficult to configure the wind guide path so as to enable an air flow during operation to be directed in from alongside the cover member and to be discharged toward alongside the cover member.

SUMMARY AND OBJECTS OF THE INVENTION

An object of an embodiment of the present invention is to provide an electrical unit cooling structure for motorcycles which is enabled to effectively cool the electrical units, even if the longitudinal length of the cover member in which the electrical units to be cooled are accommodated is short, by easily guiding a flow of air during operation toward the electrical units.

In order to achieve the object stated above according to an embodiment of the present invention, a second cover member which constitutes at least a part of a body cover together with a first cover member is so arrayed ahead of the first cover member which accommodates an electrical unit to be cooled so as to communicate with the front part of first cover member. A flow of air during operation is supplied to the inlets which let a flow of air during operation into the second cover member. The inlets are disposed in the second cover member. A flow of air during operation is discharged through an outlet which discharges a flow of air during operation out of the first cover member. The outlet is provided in the first cover member.

According to an embodiment of the present invention, another electrical unit to be arranged ahead of the electrical unit is accommodated in the second cover member behind the inlets.

According to an embodiment of the present invention, a housing projection is formed parallel to the widthwise direction of the vehicle and facing forward are disposed in the second cover member and the running-generated wind inlets are formed in the housing projection.

According to an embodiment of the present invention, the electrical unit to be cooled is a regulator having a plurality of fins; the regulator is accommodated within the first cover member in a fixed manner in a posture having the fins downward; and the flow of air during operation to the outlet arranged behind and lower than the regulator is disposed in the lower part of the first cover member.

According to an embodiment of the present invention, an electronic control unit accommodated in the body cover is arranged above the regulator.

In addition, the rear cowl 44 in the exemplary embodiment corresponds to the body cover according to the invention, the tray 45 in the embodiment corresponds to the second cover member according to the invention, the lower seat cowl 47 in the embodiment corresponds to the first cover member, the regulator 49 in the embodiment corresponds to one electrical unit according to the invention, and the battery 50 in the embodiment corresponds to another electrical unit according to the invention.

According to an embodiment of the present invention, as the second cover member communicating with the first cover member is arrayed ahead of the first cover member and a flow of air during operation is let in through the inlets disposed in the second cover member flow from the second cover member to the first cover member and are discharged through the outlet provided in the first cover member, even if the first cover member to accommodate the electrical unit to be cooled is short in the longitudinal direction, it enables a flow of air during operation to flow from the second cover member arrayed ahead of the first cover member into the first cover member, with guidance of a flow of air during operation to around the electrical unit is facilitated. Thus, an effective cooling of the electrical unit is thereby made possible.

Further, according to an embodiment of the present invention, as the electrical unit ahead of the electrical unit to be cooled is accommodated in the second cover member behind the inlets, a flow of air during operation is let into the second cover member through the inlets can also act to cool the other electrical unit.

According to an embodiment of the present invention, as the inlets are formed in the housing projection or steps provided parallel to the widthwise direction of the vehicle and facing forward are disposed in the second cover member, a flow of air during operation can be more easily let in and the inlets can be made less visible in the profile thereby to improve the appearance aesthetically.

According to an embodiment of the present invention, as the regulator having a plurality of fins is accommodated within the first cover member in a fixed manner in a posture having the fins downward and the outlet is provided behind and lower than the regulator in the lower part of the first cover member, a flow of air during operation is caused to effectively flow around the fins of the regulator to enhance the efficiency of cooling the regulator. At the same time the outlet is made less visible in the profile thereby to improve the appearance aesthetically.

According to an embodiment of the present invention, as the regulator is in a posture having the fins downward and a wind guide path is formed underneath the regulator to form an unoccupied space above the regulator and to arrange the electronic control unit with high space efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below with reference to one exemplary embodiment thereof, which is illustrated in the accompanying drawings.

Figure 1:
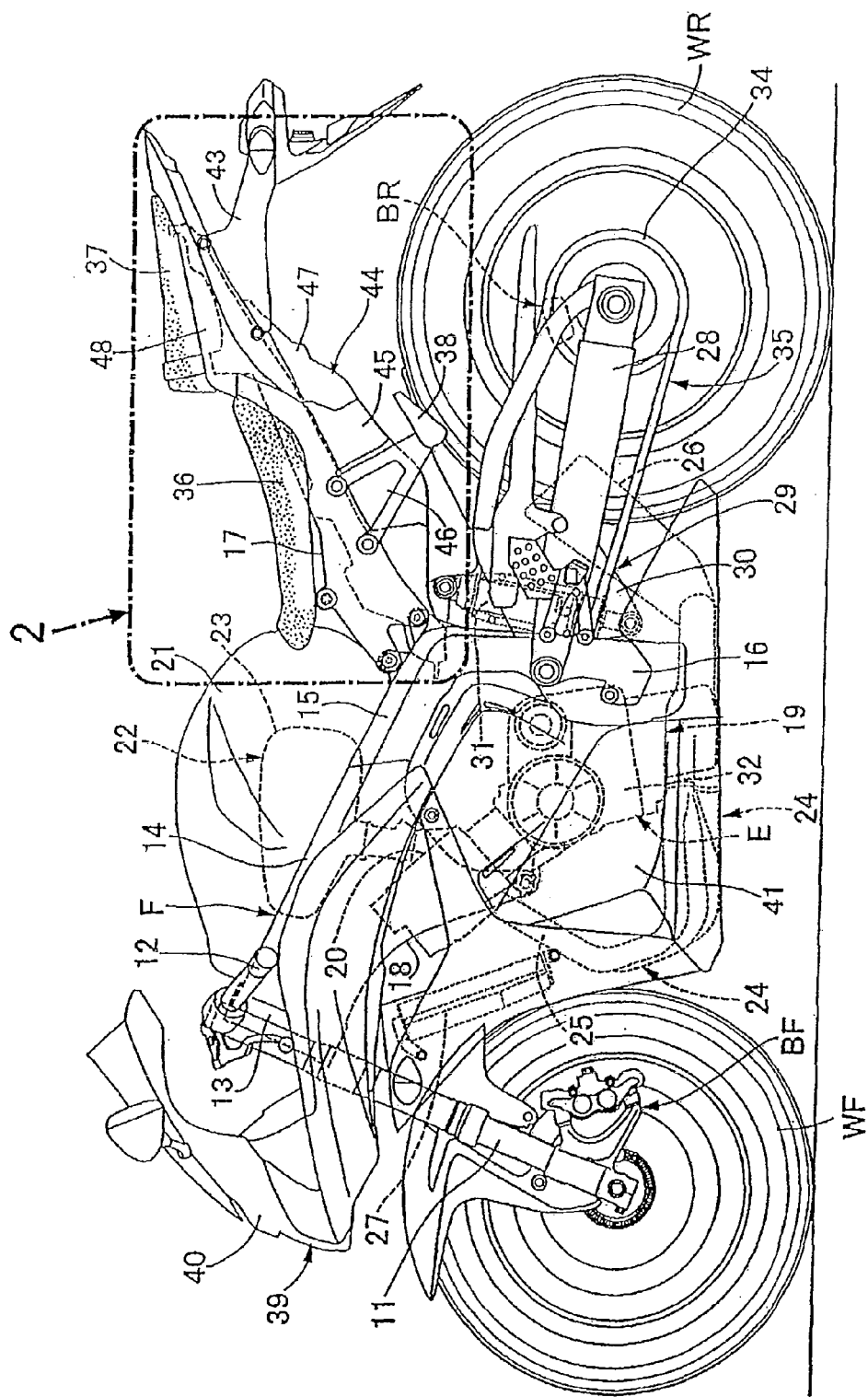
FIG. 1 is a left side profile of a motorcycle.

FIG. 1 through FIG. 7 show one embodiment of the present invention. As illustrated in FIG. 1, the body frame F of a motorcycle is equipped with a front fork 11 journaling the front wheel WF to which a wheel brake BF for the front wheel is fitted, a head pipe 13 steerably bearing a steering handlebar 12 linked to the front fork 11, a pair of left and right main frames 14 extending from the head pipe 13 in a backward descending direction, center frames 15 respectively connected to the rear parts of the two main frames 14, pivot plates 16 extending downward linked integrally with the center frames 15, and a pair of left and right seat rails 17 connected to the rear parts of the center frames 15 and extending backward in an ascending direction.

Engine hangers 18 extending downward are integrally provided on the main frames 14, and the engine body 19 of an engine E, which is an in-line four-cylinder unit for instance, is supported in a posture in which the cylinder axis is inclined upward toward the front by the lower parts of the engine hangers 18, the center frames 15 and the pivot plates 16.

A fuel tank 21 is mounted on the two main frames 14 above the engine body 19. Further, an intake device 22 extending upward is connected to the rear face of a cylinder head 20 in the engine body 19, and an air cleaner 23 provided at the upstream end of this intake device 22 is arranged so as to be covered by the fuel tank 21. On the other hand, an exhaust device 24 connected to the forward face of the cylinder head 20 is provided with a plurality of exhaust pipes 25 connected, individually matching each cylinder, to the front face of the cylinder head 20 and extending downward from the cylinder head 20 and an exhaust muffler 26 so arranged on the right side of the rear wheel WR as to be continuous from those exhaust pipes 25. Ahead of the engine body 19, a radiator 27 is arranged in a fixed manner so as to be positioned obliquely above the exhaust pipes 25.

The forward end of a swing arm 28 which journals at its rear end the rear wheel WR to which a wheel brake BR for the rear wheel is fitted is borne by the pivot plates 16 of the body frame F to be able to oscillate vertically. A link mechanism 29 is provided between the lower part on the forward side of this swing arm 28 and the lower part of the pivot plates 16. The lower end of a shock absorber unit 31 whose upper end is connected to the swing arm 28 and extends vertically is connected to a link member 30 constituting part of the link mechanism 29.

Further, the output of a transmission (not shown) built into a crankcase 32 provided in the engine body 19 is transmitted to the rear wheel WR via chain type transmitting means 35 having an endless chain 34.

A front seat 36 for letting the rider mount on is provided on the seat rails 17 to be arranged behind the fuel tank 21; a rear seat 37 is arranged behind the front seat 36 away backward from the rear seat 37; and pillion steps 38 on which the pillion passenger can place his or her feet on are fastened to the outer side faces of the middle parts of the seat rails 17.

The forward part of the body frame F and the engine E are covered by a synthetic resin-made front cowl 39, and this front cowl 39 has a front cover part 40 covering the head pipe 13 from forward and side cover parts 41 continuous from the front cover part 40 and covering on two sides the engine body 19, the exhaust pipes 25 of the exhaust device 24 and the radiator 27.

Figure 2:
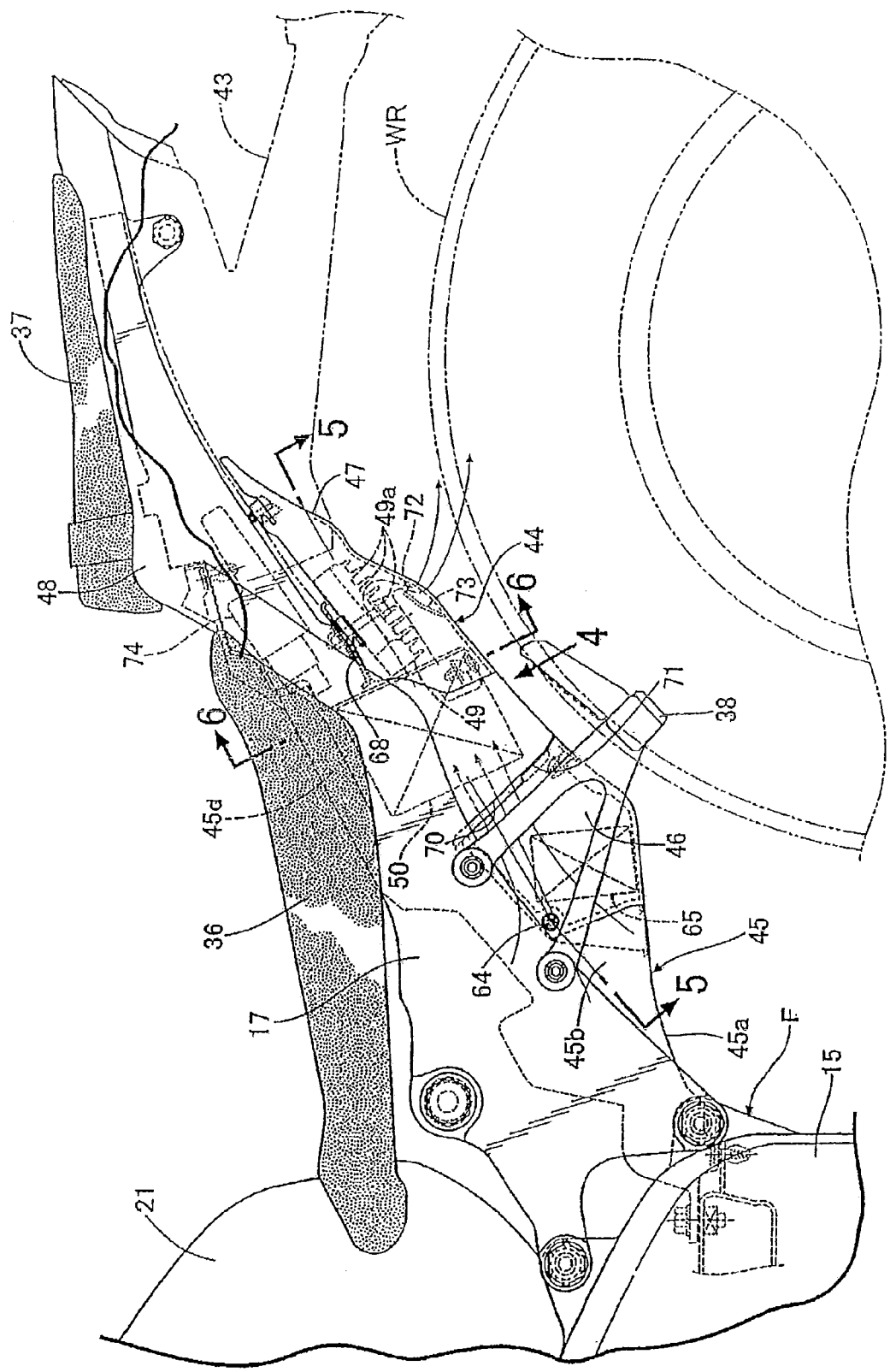
FIG. 2 is a partially cut-out and enlarged diagram of the arrowed part 2 in FIG. 1.

Referring to FIG. 2 together, a synthetic resin-made rear cowl 44 arranged below the front seat 36 and the rear seat 37 to serve as a body cover are disposed between a rear fender 43 fitted to the rear ends of the two seat rails 17 in the body frame F and covering the rear wheel WR from above and the rear end of the fuel tank 21.

This rear cowl 44 is equipped with a tray 45 open upward and arranged below the front seat 36, a motor cover 46 covering the middle part of the tray 45 from two sides and underneath, a lower seat cowl 47 disposed between the rear lower part of the tray 45 and the rear fender 43 and an upper seat cowl 48 covering the rear upper part of the tray 45 and the upper part of the rear fender 43 and connected to the upper part of the lower seat cowl 47. The tray 45 is arranged between the forward parts of the two seat rails 17 and fixed to the two seat rails 17. The upper seat cowl 48, so formed as to cover the rear part of the two seat rails 17, is fixed to the two seat rails 17.

A regulator 49 which is the electrical unit to be cooled is accommodated in the lower seat cowl 47, which is a first cover member, and a battery 50, which is another electrical unit arranged ahead of the regulator 49, is accommodated in the tray 45, which is a second cover member arrayed ahead of the lower seat cowl 47 so as to constitute at least a part of the rear cowl 44 (a part in this embodiment) together with the lower seat cowl 47.

Figure 3:
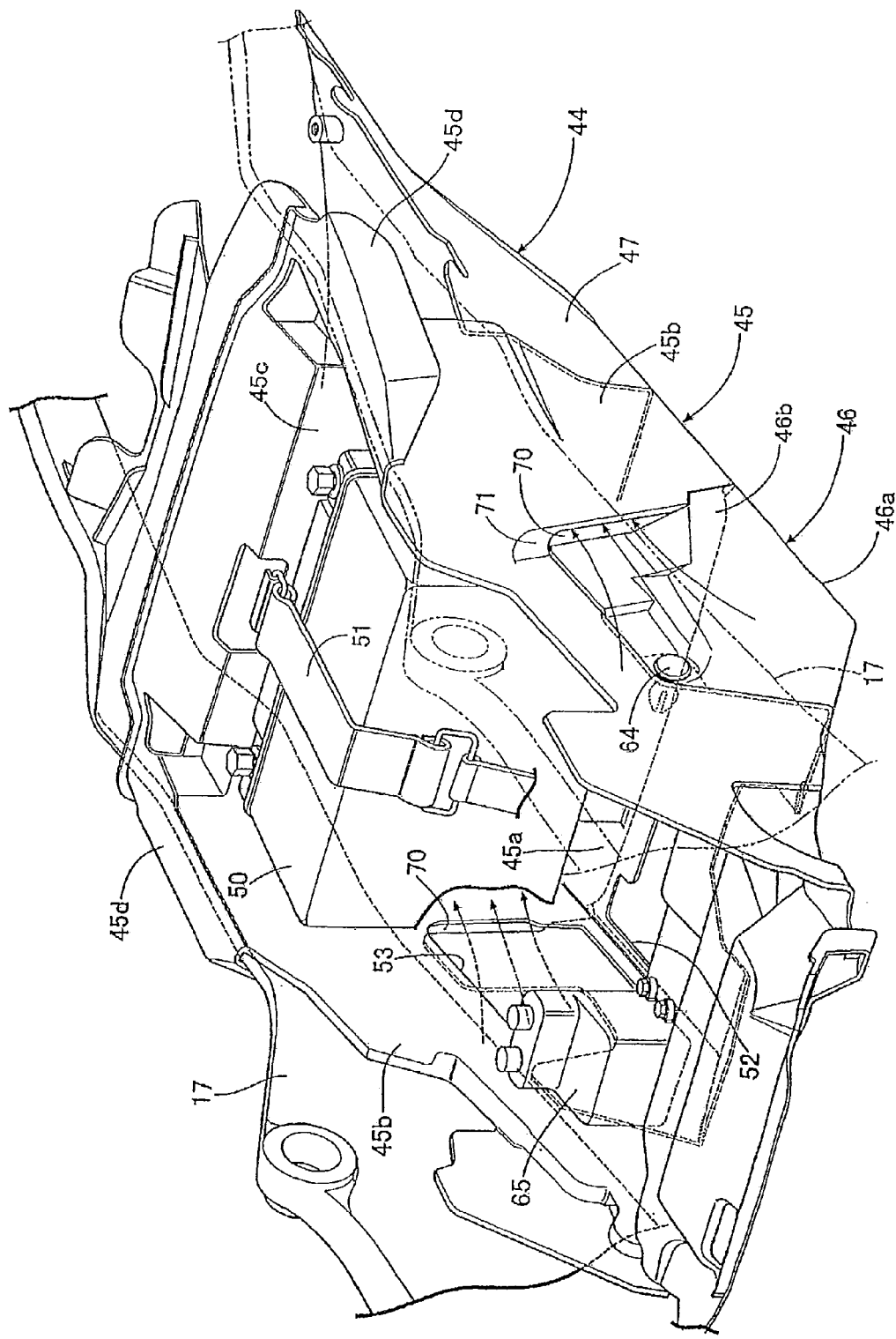
FIG. 3 is a perspective view of the tray seen from the front obliquely above it.

In FIG. 3, the tray 45 integrally has a pair of side plate parts 45a and 45a arranged with left-to-right spacing between them, a bottom plate part 45b linking the lower portions of the two side plate parts 45a and a rear plate part 45c connecting the bottom plate part 45b and the rear ends of the two side plate parts 45a, and is formed so as to be open forward and upward. Moreover, bulging support parts 45d and 45d which bulge sideways are provided on the middle upper end portions of the two respective side plate parts 45a integrally. The bulging support parts 45d and 45d are mounted on the middle portions of the two seat rails 17.

Figure 4:
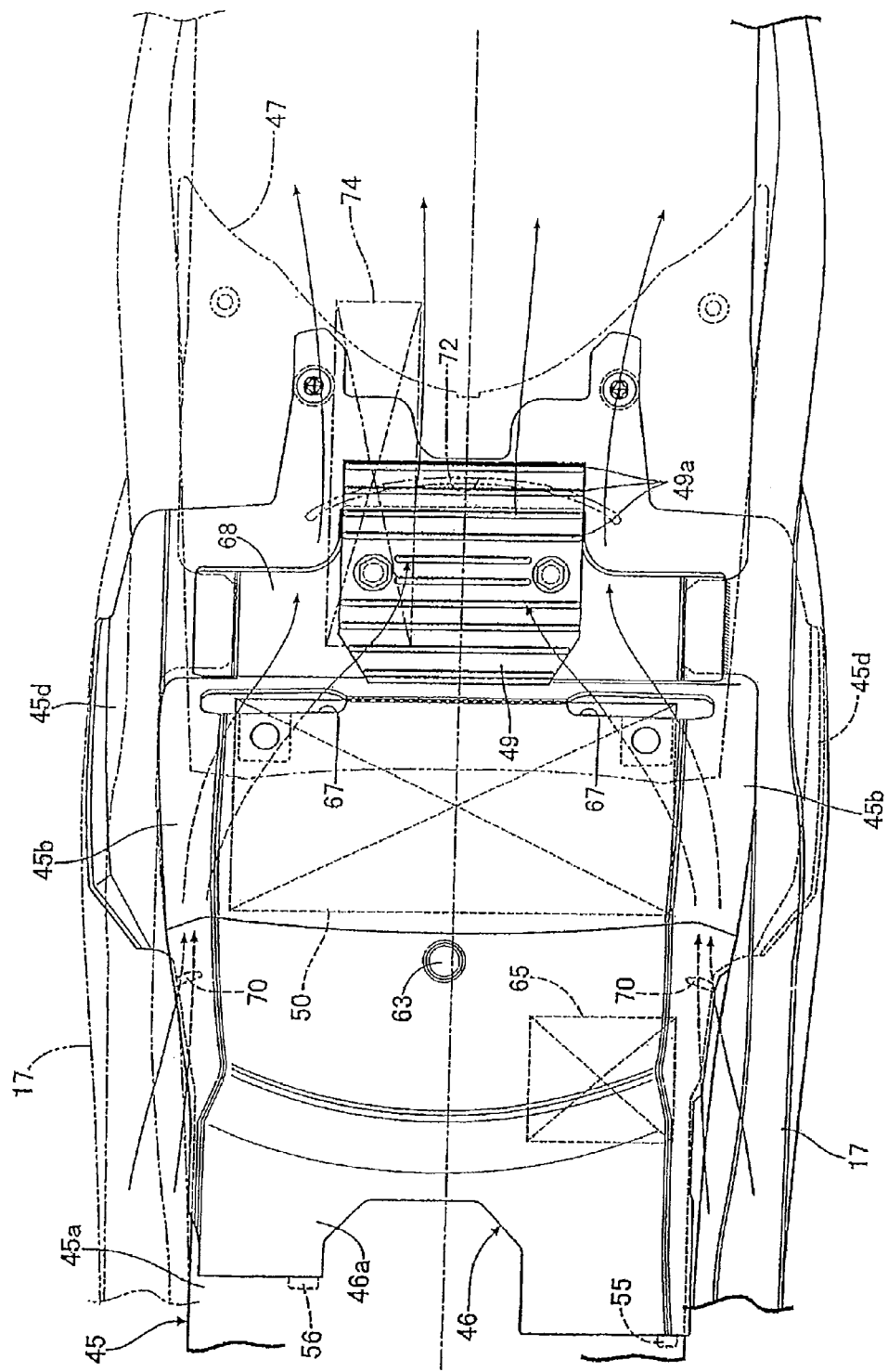
FIG. 4 is the arrowed part 4 in FIG. 2 in a state in which the lower seat cowl is omitted.
Figure 5:
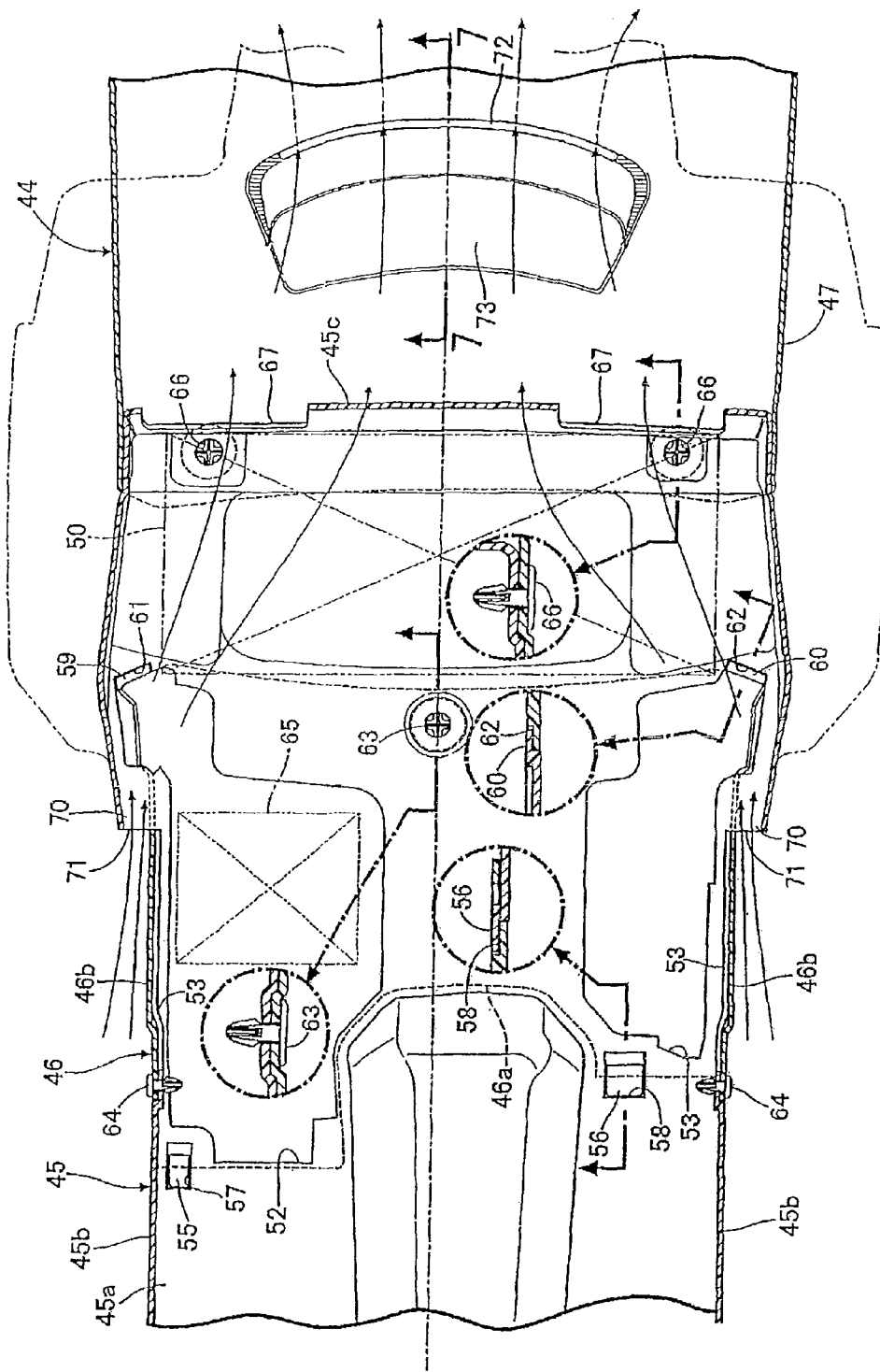
FIG. 5 is a section cut by line 5-5 in FIG. 2.

Referring to FIG. 4 and FIG. 5 together, the battery 50 is arranged in a position near the rear part of the bottom plate part 45b, namely the rear plate part 45c, in the tray 45, and is fixed to the tray 45 with a fastening belt 51. In the bottom of the tray 45 ahead of the battery 50, first and second see-through holes 52 and 53 separated left and right are provided; in each of the two side plate parts 45a of the tray 45, one of third see-through holes 54 and 54 is provided; and the motor cover 46 is so fitted to the tray 45 as to close the first through third see-through holes 52 through 54.

Thus, the motor cover 46 is so formed that a bottom plate cover part 46a which is in contact with the under face of the bottom plate part 45b of the tray 45 from underneath to close the first and second see-through holes 52 and 53 and a pair of side plate cover parts 46b and 46b which are in contact with the outer faces of the two side plate parts 45a of the tray 45 to close the third see-through holes 54 constitute a substantial U shape. In addition, a pair of engaging claws 55 and 56 disposed on the two sides of the forward edge of the bottom plate cover part 46a are respectively engaged with engaging holes 57 and 58 bored in the bottom plate part 45b of the tray 45 ahead of the first and second see-through holes 52 and 53. A pair of engaging parts 59 and 60 disposed on the two sides of the bottom plate cover part 46a are engaged from inside with stopping parts 61 and 62 disposed on the two sides of the rear edge of the first and second see-through holes 52 and 53. The center of the rear part of the bottom plate cover part 46a is fitted to the bottom plate part 45b of the tray 45 with a trim clip 63. The upper portions of the forward side of the two side plate parts 45a are fitted to the side plate parts 45a of the tray 45 with trim clips 64 and 64.

In the parts of the bottom plate part 45b of the tray 45 matching the first see-through holes 52, an electric motor 65 is fixed onto the bottom plate cover part 46a of the motor cover 46 so as to be positioned ahead of the battery 50 The electric motor 65 is also accommodated in the tray 45.

Figure 6:
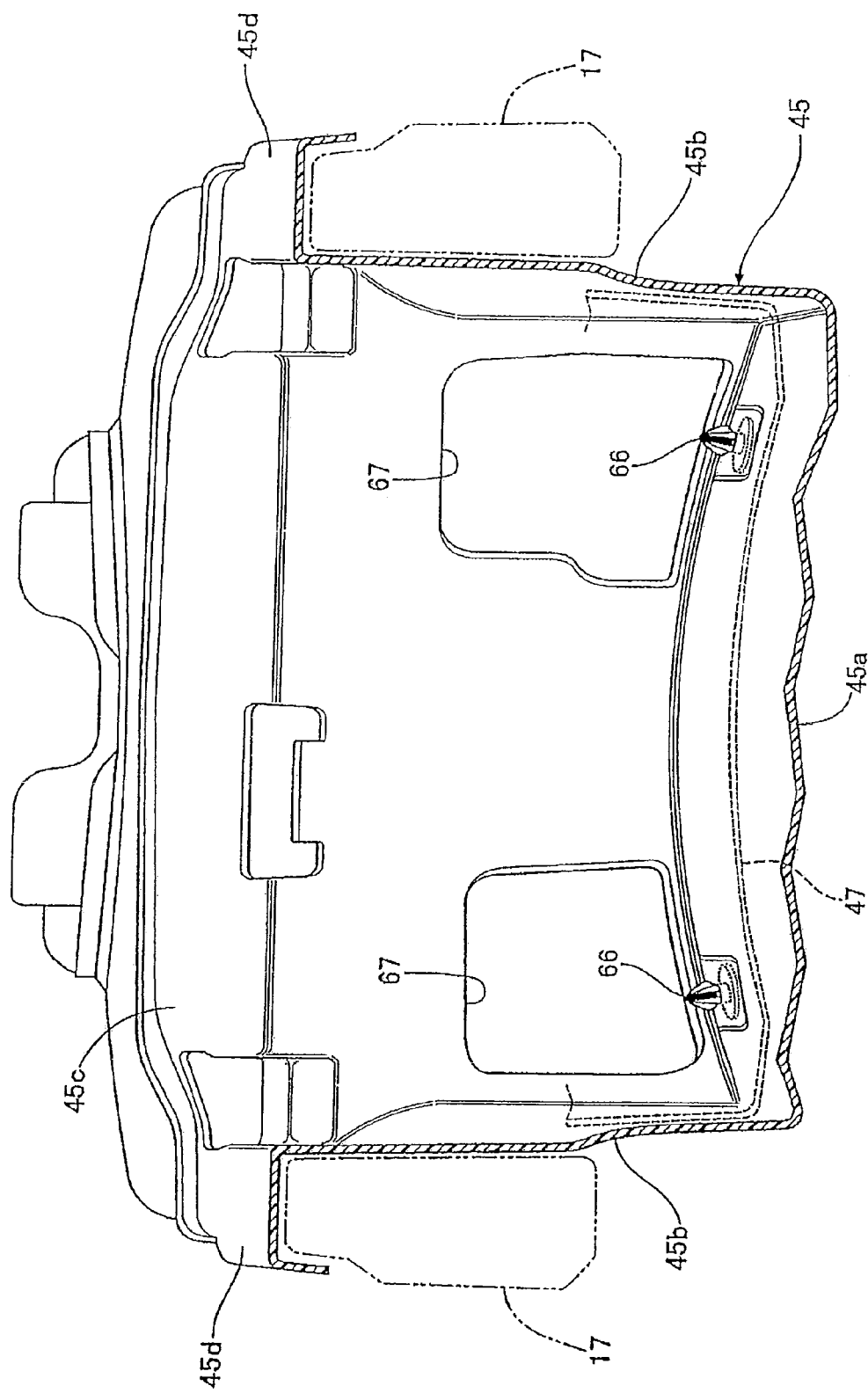
FIG. 6 is the arrowed part 6 in FIG. 2.

Referring also to FIG. 6, the lower seat cowl 47 is so formed as to have a substantially U-shaped cross section; the forward part of the lower seat cowl 47 is snapped from underneath onto the lower part of the rear side of the tray 45, and the two sides of the forward part of the lower seat cowl 47 are fitted to two sides of the rear parts of the bottom plate parts 45b in the tray 45 with trim clips 66 and 66. Moreover, a pair of communicating holes 67 and 67 matching the two sides of the battery 50 are provided underneath the rear plate part 45c in the tray 45. The forward part of the lower seat cowl 47 communicates with the rear part of the tray 45 via the two communicating holes 67.

A cross member 68 is provided spanning the two seat rails 17 above the lower seat cowl 47, and the regulator 49 having a plurality of fins 49a is fitted to the cross member 68 in a posture having the fins 49a downward, and is accommodated in the lower seat cowl 47.

The two bottom plate parts 45b of the tray 45 are provided with inlets 70 and 70 for letting a flow of air during operation into the tray 45. The inlets 70 are disposed on the bottom plate parts 45b ahead of the battery 50. Thus, the battery 50 is accommodated in the tray 45 behind the inlets 70.

In addition, behind the motor cover 46, the bottom plate parts 45b of the tray 45 are formed bulging farther outward than the motor cover 46 while forming a housing projection or steps 71 and 71 parallel to the widthwise direction of the vehicle, facing forward immediately behind the motor cover 46, and the inlets 70 are formed in the housing projection 71.

Further, the lower seat cowl 47 is provided with an outlet 72 for discharging running-generated winds out of the lower seat cowl 47, and this running-generated wind outlet 72 is arranged underneath the rear part of the regulator 49.

Figure 7:
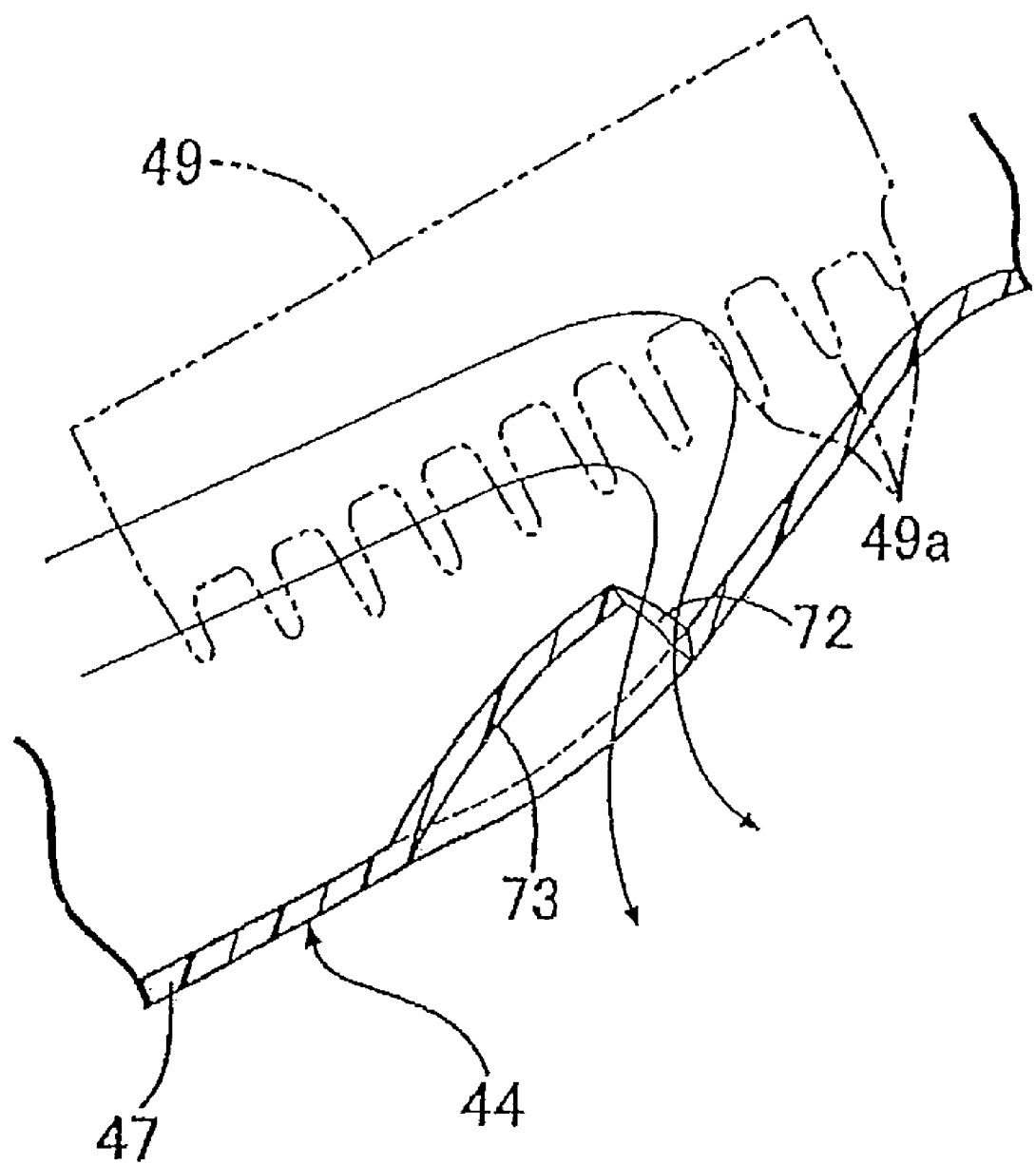
FIG. 7 is a section cut by line 7-7 in FIG. 5.

As shown in FIG. 7, a concave 73 depressed upward, increasing in depth toward the rear, is provided in the under face of the central part of the lower seat cowl 47 in the widthwise direction, and the outlet 72 is so provided in the lower seat cowl 47 as to open at the rear end of this concave 73.

Moreover, whereas an electronic control unit 74 arranged between the rear part of the tray 45 and the forward part of the upper seat cowl 48 and supported by the two seat rails 17 is accommodated in the rear cowl 44, this electronic control unit 74 is arranged above the regulator 49.

Next to describe the actions of this embodiment, in the forward part of the lower seat cowl 47 which accommodates the regulator 49 to be cooled, the tray 45 which constitutes at least a part of the rear cowl 44 (a part in this embodiment) together with the lower seat cowl 47 is so arrayed ahead of the lower seat cowl 47 via the pair of communicating holes 67. The inlets 70 which let a flow of air during operation into the tray 45 are disposed in the tray 45; and the outlet 72 to discharge a flow of air during operation out of the lower seat cowl 47 is provided in the lower seat cowl 47.

Therefore, as a flow of air during operation is let in through the inlets 70 disposed in the tray 45 flow from the tray 45 to the lower seat cowl 47 and discharged through the outlet 72 disposed in the lower seat cowl 47, even if the lower seat cowl 47 to accommodate the regulator 49 to be cooled is short in the longitudinal direction, it enables a flow of air during operation to flow from the tray 45 arrayed ahead of the lower seat cowl 47 into the lower seat cowl 47, facilitates guidance of running-generated winds to around the regulator 49, and thereby makes possible effective cooling of the regulator 49.

Further, as the battery 50, which is another electrical unit arranged ahead of the regulator 49, is accommodated in the tray 45 behind the inlets 70, it is also possible to cool the battery 50 with a flow of air during operation directed into the tray 45 through the wind inlets 70.

Further, as the housing projection or steps 71, formed parallel to the widthwise direction of the vehicle and facing forward, are disposed in the tray 45 and the inlets 70 are formed in the housing projection or steps 71, it is made easier to let a flow of air during operation into the tray 45 and to make the inlets 70 less visible in the profile thereby to improve the appearance aesthetically.

Further, as the regulator 49 is accommodated within the lower seat cowl 47 in a fixed manner in a posture having the fins 49a downward and the outlet 72 is arranged behind and lower than the regulator 49 in the lower part of the lower seat cowl 47, a flow of air during operation is caused to effectively flow around the fins 49a of the regulator 49 to enhance the efficiency of cooling the regulator 49. At the same time the outlet 72 is made less visible in the profile thereby to improve the appearance aesthetically.

Moreover, as the electronic control unit 74 accommodated in the rear cowl 44 is arranged above the regulator 49, the configuration in which a path for a flow of air during operation is formed underneath the regulator 49 and can be utilized to form an unoccupied space above the regulator 49 and to arrange the electronic control unit 74 with high space efficiency.

Although an exemplary embodiment of the present invention has been hitherto described, the invention is not limited to this embodiment, but the design can be altered in various ways without deviating from the invention as described in the scope of the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrical unit cooling structure for a motorcycle, comprising:
   a first cover member;
   a second cover member which constitutes at least a part of a body cover together with the first cover member, the second cover member being so positioned ahead of the first cover member in a direction of travel of the motorcycle, said first cover member accommodating an electrical unit to be cooled, said electrical unit being in communication with the front part of first cover member;
   a inlet for supplying a flow of air during operation into the second cover member, the inlet being disposed in the second cover member; and
   an outlet for discharging a flow of air during operation out of a lower seat cowl, the outlet being provided in the first cover member.

2. The electrical unit cooling structure for a motorcycle according to claim 1, wherein another electrical unit to be arranged ahead of the electrical unit is accommodated in the second cover member behind the inlet.

3. The electrical unit cooling structure for a motorcycle according to claim 1, wherein a housing projection is formed parallel to the widthwise direction of the vehicle and facing forward, the housing projection is disposed in the second cover member and the inlet is formed in the housing projection.

4. The electrical unit cooling structure for a motorcycle according to claim 2, wherein a housing projection is formed parallel to the widthwise direction of the vehicle and facing forward, the housing projection is disposed in the second cover member and the inlet is formed in the housing projection.

5. The electrical unit cooling structure for a motorcycle according to claim 1, wherein the electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

6. The electrical unit cooling structure for a motorcycle according to claim 2, wherein the electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

7. The electrical unit cooling structure for a motorcycle according to claim 3, wherein the electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

8. The electrical unit cooling structure for a motorcycle according to claim 4, wherein the electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

9. The electrical unit cooling structure for a motorcycle according to claim 5, wherein an electronic control unit accommodated in the body cover is arranged above the regulator.

10. The electrical unit cooling structure for a motorcycle according to claim 6, wherein an electronic control unit accommodated in the body cover is arranged above the regulator.

11. An electrical unit cooling structure for a motorcycle, comprising:
    a body cover;
    a first cover member forming at least part of the body cover;
    a second cover member forming at least a part of the body cover together with the first cover member, said second cover member being positioned adjacent to and ahead of the first cover member as viewed in a direction of travel of the motorcycle;
    a first electrical unit to be cooled, said first electrical unit being positioned within said first cover and being positioned to be in communication with the front part of first cover member;
    a inlet for supplying a flow of air during operation into the second cover member, said inlet being disposed in the second cover member; and
    an outlet for discharging a flow of air during operation out of a lower seat cowl, the outlet being provided in the first cover member.

12. The electrical unit cooling structure for a motorcycle according to claim 11, wherein a second electrical unit to be arranged ahead of the first electrical unit is accommodated in the second cover member behind the inlet.

13. The electrical unit cooling structure for a motorcycle according to claim 11, wherein a housing projection is formed parallel to the widthwise direction of the vehicle and facing forward, the housing projection is disposed in the second cover member and the inlet is formed in the housing projection.

14. The electrical unit cooling structure for a motorcycle according to claim 12, wherein a housing projection is formed parallel to the widthwise direction of the vehicle and facing forward, the housing projection is disposed in the second cover member and the inlet is formed in the housing projection.

15. The electrical unit cooling structure for a motorcycle according to claim 11, wherein the first electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

16. The electrical unit cooling structure for a motorcycle according to claim 12, wherein the first electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

17. The electrical unit cooling structure for a motorcycle according to claim 13, wherein the first electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

18. The electrical unit cooling structure for a motorcycle according to claim 14, wherein the first electrical unit to be cooled is a regulator having a plurality of fins, the regulator is accommodated within the first cover member in a fixed manner in a posture having the fins extending downwardly and the outlet, arranged behind and lower than the regulator, is disposed in the lower part of the first cover member.

19. The electrical unit cooling structure for a motorcycle according to claim 15, wherein an electronic control unit accommodated in the body cover is arranged above the regulator.

20. The electrical unit cooling structure for a motorcycle according to claim 16, wherein an electronic control unit accommodated in the body cover is arranged above the regulator.

* * * * *